United States Patent
Navarrete Michelini et al.

(10) Patent No.: US 10,467,737 B2
(45) Date of Patent: Nov. 5, 2019

(54) METHOD AND DEVICE FOR ADJUSTING GRAYSCALE VALUES OF IMAGE

(71) Applicant: BOE TECHNOLOGY GROUP CO., LTD., Beijing (CN)

(72) Inventors: Pablo Navarrete Michelini, Beijing (CN); Han Yan, Beijing (CN); Ran Duan, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/750,515

(22) PCT Filed: Jun. 20, 2017

(86) PCT No.: PCT/CN2017/089191
§ 371 (c)(1),
(2) Date: Feb. 6, 2018

(87) PCT Pub. No.: WO2018/045789
PCT Pub. Date: Mar. 15, 2018

(65) Prior Publication Data
US 2019/0139204 A1    May 9, 2019

(30) Foreign Application Priority Data
Sep. 12, 2016  (CN) ......................... 2016 1 0817407

(51) Int. Cl.
*G06T 5/40* (2006.01)
*G06T 5/00* (2006.01)

(52) U.S. Cl.
CPC ............... *G06T 5/40* (2013.01); *G06T 5/002* (2013.01); *G06T 5/007* (2013.01); *G06T 2207/10024* (2013.01)

(58) Field of Classification Search
None
See application file for complete search history.

(56) References Cited

U.S. PATENT DOCUMENTS 5,214,711 A * 5/1993 Neely ..................... G06T 7/254
382/107
5,832,103 A * 11/1998 Giger ................. G06K 9/00127
382/130

(Continued)

FOREIGN PATENT DOCUMENTS

CN       1750044 A   *   3/2006
CN     102542528 A       7/2012

(Continued)

OTHER PUBLICATIONS

Machine Translation for CN 1750044 A (Year: 2006).*

(Continued)

*Primary Examiner* — Michelle M Entezari
(74) *Attorney, Agent, or Firm* — Calfee, Halter & Griswold LLP

(57) ABSTRACT

A method for adjusting grayscale values of an image includes: for each pixel in the image, calculating a first mapping value for a grayscale value of the pixel in the image through a histogram equalization mapping function; calculating a second mapping value by subtracting a first preset value from the grayscale value of the pixel through the histogram equalization mapping function, and when the result exceeds a preset grayscale range, selecting a minimum value of the preset grayscale range for calculating the second mapping value; calculating a third mapping value by adding a second preset value to the grayscale value of the pixel through the histogram equalization mapping function and when the result exceeds the preset grayscale range, selecting a maximum value of the preset grayscale range; and calculating an output grayscale value of the pixel based on the first, second, and third mapping value and respective weights.

14 Claims, 4 Drawing Sheets

(56) References Cited

U.S. PATENT DOCUMENTS

| | | | | |
|---|---|---|---|---|
| 5,963,665 | A * | 10/1999 | Kim | G06T 5/40 348/254 |
| 6,650,774 | B1 * | 11/2003 | Szeliski | G06T 5/008 348/225.1 |
| 7,102,697 | B2 * | 9/2006 | Lei | G06T 5/009 348/678 |
| 7,639,893 | B2 * | 12/2009 | Duan | G06T 5/007 345/589 |
| 7,881,556 | B2 * | 2/2011 | Chen | G06T 5/008 382/274 |
| 8,330,768 | B2 * | 12/2012 | Mantiuk | H04N 1/6027 345/589 |
| 9,165,210 | B1 * | 10/2015 | Srinivasan | G06T 5/008 |
| 9,418,408 | B1 * | 8/2016 | Thompson | G06T 5/009 |
| 9,418,410 | B2 * | 8/2016 | Kim | G06T 5/40 |
| 10,270,981 | B2 * | 4/2019 | Meuter | H04N 19/428 |
| 2011/0122146 | A1 * | 5/2011 | Nie | G06T 5/004 345/589 |
| 2011/0254976 | A1 * | 10/2011 | Garten | G06F 3/1454 348/229.1 |
| 2012/0224063 | A1 * | 9/2012 | Terre | G08B 13/1963 348/148 |
| 2013/0287299 | A1 * | 10/2013 | Huang | G06T 9/00 382/169 |
| 2014/0313343 | A1 * | 10/2014 | Frank | H04N 5/33 348/164 |
| 2014/0348428 | A1 | 11/2014 | Lee | |
| 2016/0104438 | A1 * | 4/2016 | Han | G09G 3/3413 345/690 |

FOREIGN PATENT DOCUMENTS

| | | |
|---|---|---|
| CN | 102693531 A | 9/2012 |
| CN | 104574337 A | 4/2015 |
| CN | 105654438 A | 6/2016 |

OTHER PUBLICATIONS

Zimmerman, J.B., Pizer, S.M., Staab, E.V., Perry, J.R., McCartney, W. and Brenton, B.C., 1987. An evaluation of the effectiveness of adaptive histogram equalization for contrast enhancement. (Year: 1987).*

Arici, Tarik, Salih Dikbas, and Yucel Altunbasak. "A histogram modification framework and its application for image contrast enhancement." IEEE Transactions on image processing 18, No. 9 (2009): 1921-1935. (Year: 2009).*

Wu, Xiaolin. "A linear programming approach for optimal contrast-tone mapping." IEEE transactions on image processing 20, No. 5 (2010): 1262-1272. (Year: 2010).*

Wang, Qing, and Rabab K. Ward. "Fast image/video contrast enhancement based on weighted thresholded histogram equalization." IEEE transactions on Consumer Electronics53.2 (2007): 757-764. (Year: 2007).*

Qiu, G., Mei, Y., Lam, K. M., & Qiu, M. (2010, Sep.). Tone mapping HDR images using optimization: A general framework. In 2010 IEEE International Conference on Image Processing (pp. 3129-3132). IEEE. (Year: 2010).*

Tarik Arici, et al., "A Histogram Modification Framework and Its Application for Image Contrast Enhancement," IEEE Transactions on Image Processing, vol. 18, No. 9, Sep. 2009. pp. 1921-1935.

International Search Report to corresponding PCT application No. PCT/CN2017/089191, dated Sep. 22, 2017, 14 pages.

* cited by examiner

200

201 — for each pixel in the image, calculating a first mapping value for a grayscale value of the pixel in the image through a histogram equalization mapping function

203 — calculating a second mapping value by subtracting a first preset value from the grayscale value of the pixel through the histogram equalization mapping function, and when the result of subtracting the first preset value from the grayscale value exceeds a preset grayscale range, selecting a minimum value of the preset grayscale range for calculating the second mapping value

205 — calculating a third mapping value by adding a second preset value to the grayscale value of the pixel through the histogram equalization mapping function and when the result of adding the second preset value to the grayscale value exceeds the preset grayscale range, selecting a maximum value of the preset grayscale range for calculating the third mapping value

207 — calculating an output grayscale value of the pixel based on the first mapping value, the second mapping value, and the third mapping value and respective weights

Fig. 2

METHOD AND DEVICE FOR ADJUSTING GRAYSCALE VALUES OF IMAGE

CROSS-REFERENCE TO RELATED APPLICATIONS

The present application is based on International Application No. PCT/CN2017/089191, filed on Jun. 20, 2017, which is based upon and claims priority to Chinese Patent Application No. 201610817407.2, titled "METHOD AND DEVICE FOR ADJUSTING GRAYSCALE VALUES OF IMAGE", filed Sep. 12, 2016, and the entire contents thereof are incorporated herein by reference.

TECHNICAL FIELD

Embodiments of the present disclosure relates to the field of information technology, and more particularly, to a method and a device for adjusting grayscale values of an image.

BACKGROUND

In recent years, with the rapid development of electronic technology and image processing technology, image or vision systems are widely used in various industries such as traffic monitoring, driving assistance systems, public security, frontier customs, sports event reporting, event detection, tracking, scene analysis and classification, object detection and recognition, image indexing and retrieval and many other fields. In most image or vision processing applications/systems, such as digital photography, medical image analysis, remote sensing, LCD display processing, and scientific visualization, image contrast adjustment may play a key role.

In general, images/videos have poor contrast due to a number of reasons (e.g., the distribution of the grayscale values of the images is relatively concentrated), for example, the quality of the imaging device used is poor, the operator is inexperienced, unfavorable external conditions (such as rain, snow, smoke, fog, dust, dust, etc.) when the image is being captured and the like. These reasons may result in a lesser dynamic range of the acquired image. Therefore, such an image or video may not display all details in the captured scene, and the captured image may appear faded and unnatural. In addition, the grayscale values of some images may be concentrated in narrower intervals, which may also cause the image details to be not clear enough. For example, an overexposed image with its grayscales concentrated in the high-brightness range, and an underexposed image with its grayscales concentrated in the low-brightness range. In general, contrast enhancement techniques, such as histogram equalization, may be employed to pull apart the gray-scale values of an image or to average the gray-scale values, thereby increasing the dynamic range of the contrast, making the image clearer in detail, and enhancing the contrast.

However, contrast enhancement techniques, such as histogram equalization techniques, may result in issues such as voids in the output histogram, excessively enhanced output, failure to provide control parameters and/or uncontrollable noise and banded interference, and so on.

Therefore, an improved image grayscale value adjustment scheme is demanded.

It should be noted that, information disclosed in the above background portion is provided only for better understanding of the background of the present disclosure, and thus it may contain information that does not form the prior art known by those ordinary skilled in the art.

SUMMARY

According to one aspect of the present disclosure, there is disclosed a method for adjusting grayscale values of an image. The method comprises: for each pixel in the image, calculating a first mapping value for a grayscale value of the pixel in the image through a histogram equalization mapping function; calculating a second mapping value by subtracting a first preset value from the grayscale value of the pixel through the histogram equalization mapping function, and when the result of subtracting the first preset value from the grayscale value exceeds a preset grayscale range, selecting a minimum value of the preset grayscale range for calculating the second mapping value; calculating a third mapping value by adding a second preset value to the grayscale value of the pixel through the histogram equalization mapping function and when the result of adding the second preset value to the grayscale value exceeds the preset grayscale range, selecting a maximum value of the preset grayscale range for calculating the third mapping value; and calculating an output grayscale value of the pixel based on the first mapping value, the second mapping value, and the third mapping value and respective weights.

In an embodiment, the first preset value is the same as the second preset value.

In an embodiment, each of the first preset value and the second present value is equal to 1.

In an embodiment, the method also includes: calculating the weights of each pixel based on pixels within a specified range around the pixel.

In an embodiment, the pixels within the specified range around each pixel comprise at least 3 adjacent pixels.

In an embodiment, the pixels within the specified range around each pixel comprise all pixels or a part of pixels within the specified range around the pixel.

In an embodiment, the method also includes: for each pixel, determining a weight of the first mapping value based on a number of pixels within the specified range around the pixel, each of which has a grayscale value equal to the grayscale value of the pixel; for each pixel, determining a weight of the second mapping value based on a number of pixels within the specified range around the pixel, each of which has a grayscale value smaller than the grayscale value of the pixel; for each pixel, determining a weight of the third mapping value based on a number of pixels within the specified range around the pixel, each of which has a grayscale value larger than the grayscale value of the pixel.

According to another aspect of the present disclosure, there is disclosed a device for adjusting grayscale values of an image. The device includes: a module configured to, for each pixel in the image, calculate a first mapping value for a grayscale value of the pixel in the image through a histogram equalization mapping function; a module configured to calculate a second mapping value by subtracting a first preset value from the grayscale value of the pixel through the histogram equalization mapping function, and when the result of subtracting the first preset value from the grayscale value exceeds a preset grayscale range, select a minimum value of the preset grayscale range for calculating the second mapping value; a module configured to calculate a third mapping value by adding a second preset value to the grayscale value of the pixel through the histogram equalization mapping function and when the result of adding the second preset value to the grayscale value exceeds the preset grayscale range, select a maximum value of the preset grayscale range for calculating the third mapping value; and a module configured to calculate an output grayscale value of the pixel based on the first mapping value, the second mapping value, and the third mapping value and respective weights.

In an embodiment, the first preset value is the same as the second preset value.

In an embodiment, each of the first preset value and the second present value is equal to 1.

In an embodiment, the device also includes: a module configured to calculate the weights of each pixel based on pixels within a specified range around the pixel.

In an embodiment, the pixels within the specified range around each pixel comprise at least 3 adjacent pixels.

In an embodiment, the pixels within the specified range around each pixel comprise all pixels or a part of pixels within the specified range around the pixel.

In an embodiment, the device also includes: a module configured to, for each pixel, determine a weight of the first mapping value based on a number of pixels within the specified range around the pixel, each of which has a grayscale value equal to the grayscale value of the pixel, for each pixel, determine a weight of the second mapping value based on a number of pixels within the specified range around the pixel, each of which has a grayscale value smaller than the grayscale value of the pixel, for each pixel, determine a weight of the third mapping value based on a number of pixels within the specified range around the pixel, each of which has a grayscale value larger than the grayscale value of the pixel.

BRIEF DESCRIPTION OF THE DRAWINGS

FIG. 2 is a flowchart illustrating a method according to an embodiment of the present disclosure.

DETAILED DESCRIPTION

The embodiments of the present disclosure are described below with reference to the drawings. In the following description, numerous specific details are set forth in order to enable those of ordinary skill in the art to more fully understand and implement the present disclosure. However, it will be apparent to those skilled in the art that the present disclosure may be practiced without some of these specific details. In addition, it is to be understood that the present disclosure is not limited to the particular embodiments presented. Instead, it is contemplated that embodiments of the present disclosure may be practiced with any combination of the features and elements described below. Accordingly, the following aspects, features, embodiments, and advantages are merely illustrative and should not be considered as elements or limitations of the claims, unless explicitly claimed in the claims.

Modern standards for digital television, such as BT.2020, increase the bit depth of an image to at least 10 bits per pixel. This is motivated by the capacity of modern display panels of covering a high dynamic range (e.g. >1000 cd/m$^2$). In the field of high dynamic range displays (HDRs), a popular feature is to enhance the dynamic range of the input image to expose a greater number of details and to create a better user experience. Standard contrast enhancers, such as simply resealing the range of grayscale values to cover 100% of the brightness levels, are not suitable for such applications because they produce many undesirable effects such as blinking, ribbon, and granular noise for the images in the video.

Histogram mapping technology, such as histogram equalization (HEQ), is a common method for adjusting contrast of an image. The method may redistribute pixel grayscale values of an input image Y to different values. In histogram mapping technology, a mapping function $T_Y:[0,2^{B_1-1}] \to [0, 2^{B_2-1}]$ is commonly used, where B1 and B2 are bit depths of the image. For the grayscale value Y[i,j] of each input pixel, the grayscale value of the output pixel is given by the following equation: Out[i,j]=T[Y[i,j]].

Figure 6:
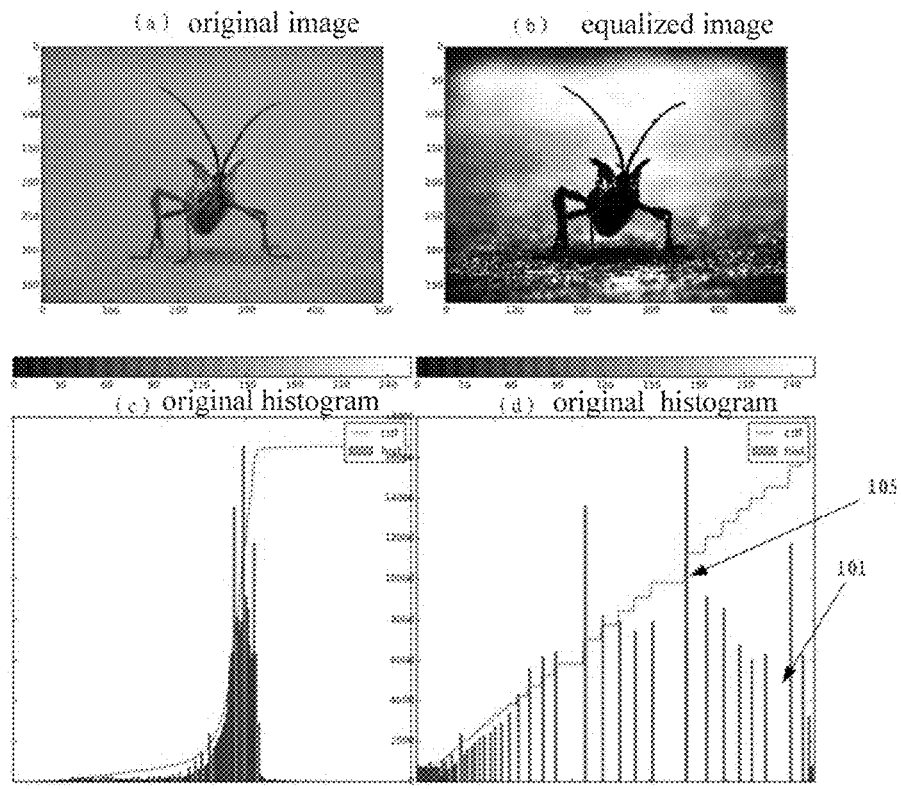
FIG. 6 shows the result of processing an image by the histogram equalization method.

FIG. 6 shows the result of processing an image by the histogram equalization method. As shown in FIG. 6, the HEQ may uniformly distribute the grayscale values of the pixels and generate a CDF (Cumulative Distribution Function) similar to a linear increase. HEQ may produce the maximum possible dynamic range, but it often leads to excessively enhanced output, may not provide control parameters and may not control noise and banded interference. As shown in FIG. 6, one particular problem with HEQ is that it does not use intermediate values. This may cause voids to be present in the resulting image histogram (as indicated by an arrow 101 in FIG. 6), as well as significant changes in the CDF (as indicated by an arrow 105 in FIG. 6).

The following Reference Document 1 provides an improved technique of histogram equalization (HEQ): T. Arici, S. Dikbas, and Y. Altunbasak, "A Histogram Modification Framework and Its Application for Image Contrast Enhancement." IEEE Trans. On Image Processing, Vol. 18, No, 9, pp. 1921-1935, September 2009, which is incorporated herein by reference in its entirety. In this reference document, the mapping function is designed to reduce the voids in the output histogram. Although the technical solution of Reference Document 1 may control the size of the voids in the histogram, voids may not be avoided. In addition, low-pass filters (LPFs), bilateral filters, median filters, etc., are also not applicable since images processed by such filters reduce the details in the output image.

The embodiments of the present disclosure provide an improved technical solution for processing grayscale values of an image. The technical solution may at least alleviate or avoid one or more of the above problems.

It should be noted that although the embodiments of the present disclosure are mainly described below in the context of a single image, it should be understood that the embodiments of the present disclosure may also be applied to a video, such as an image processing circuit applied in a display. It should also be noted that the embodiments herein may be applied not only to processing non-real-time images or videos, but also to processing real-time images or videos. In addition, it should also be noted that the image herein may be a color image or a grayscale image.

Throughout the text, the same reference numbers refer to the same elements. As used herein, the terms "data", "content", "information" and similar words are used interchangeably to refer to data that may be transmitted, received, and/or stored in accordance with an embodiment of the present disclosure. Therefore, the use of any such terms should not be construed as limiting the spirit and scope of the embodiments of the present disclosure.

Additionally, as used herein, the word "circuitry" refers to: (a) hardware-only circuit implementation (e.g., implementations in analog and/or digital circuitry); (b) circuitry and a computer program product, the computer program product(s) including: software and/or firmware instructions stored on one or more computer readable memories that work together to cause a device to perform one or more of the functions described herein; and (c) circuitry (such as, for example, a microprocessor(s) or a part of a microprocessor(s)) that require software or firmware for running, even if the software or firmware is not physically present. This definition of "circuitry" applies to all usages of this term in this document, including in any claims. As a further example, as used herein, the word "circuitry" also includes implementations that include one or more processors and/or a portion(s) thereof and are accompanied by software and/or firmware.

Figure 1:
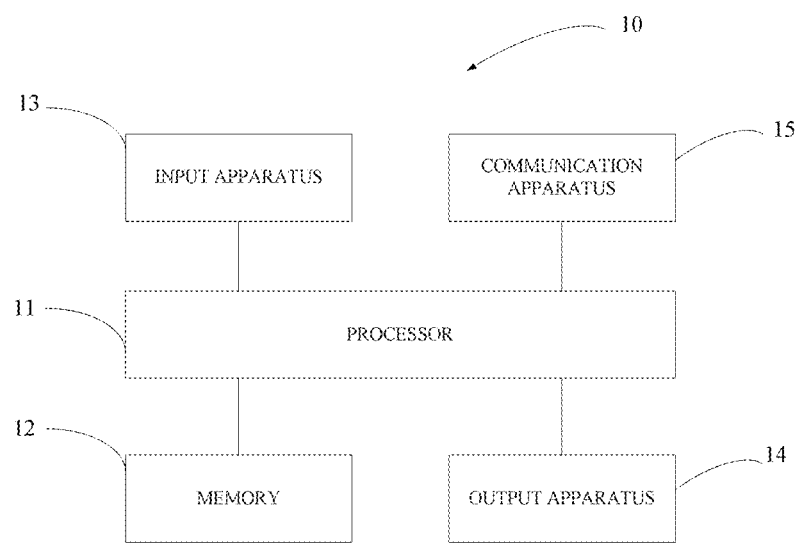
FIG. 1 is a block diagram illustrating a device to which embodiments of the present disclosure may be applied.

FIG. 1 is a block diagram illustrating a device, such as an electronic device 10, according to at least one exemplary embodiment. However, it should be understood that the electronic device described herein and hereinafter are merely illustrative of an electronic device that may benefit from embodiments of the present disclosure, and therefore should not be considered as limiting the scope of the present disclosure. Although the electronic device 10 will be described and will be described below for the purpose of example, other types of electronic devices may readily utilize the embodiments of the present disclosure. The electronic device 10 may be a display, a television, a projector, a portable digital assistant (PDA), a mobile computer, a desktop computer, a smart TV, a gaming device, a portable computer, a media player, a camera, a video recorder, a mobile phone, a global positioning systems (GPS) device, smart glasses, a car navigation system, a video surveillance system, a smart phone, a tablet computer, a laptop computer, a server, a thin client, a cloud computer, a virtual computer, a set top box, a computing device, a distributed system and/or any other type of electronic system. The electronic device 10 may run any type of operating system including but not limited to Windows, Linux, UNIX, Android, iOS, and variations thereof. In addition, in other exemplary embodiments, the electronic device of at least one exemplary embodiment need not be the entire electronic device but may be a component or a group of components of the electronic device.

In addition, the electronic device 10 may easily utilize the embodiments of the present disclosure regardless of whether the electronic device is mobile or fixed. For example, the embodiments of the present disclosure may be described in connection with a display image processing application, but the embodiments of the present disclosure may also be applied to any other applicable applications.

In at least one exemplary embodiment, the electronic device 10 includes a processor 11 and a memory 12. The processor 11 may be any type of processor, controller, embedded controller, processor core, and/or the like. In at least one exemplary embodiment, the processor 11 uses computer program code to cause the electronic device 10 to perform one or more actions. The memory 12 may include a volatile memory, such as a volatile random access memory (RAM), which contains a cache area for temporary storage of data, and/or other memory, such as a non-volatile memory, which may be embedded and/or may be removable. The non-volatile memory may include: EEPROM, flash memory, and/or the like. The memory 12 may store any number of pieces of information, as well as data. Information and data may be used by the electronic device 10 to implement one or more functions of the electronic device 10, such as those described herein. In at least one exemplary embodiment, the memory 12 includes computer program codes. The memory and the computer program codes are configured to work with the processor such that the electronic device performs one or more actions described herein.

The electronic device 10 may further include a communication module 15. In at least one exemplary embodiment, the communication module 15 includes an antenna (or multiple antennas), a wired connector, and/or the like that are in operative communication with the transmitter and/or receiver in at least one exemplary embodiment, the processor 11 provides signals to the transmitter and/or receives signals from the receiver. Signals may include signaling information according to communication interface standards, user voice, received data, user-generated data, and/or the like. The communication module 15 may operate using one or more air interface standards, communication protocols, modulation types, and access types. By way of illustration, the communication module 15 may operate according to the following protocols: second generation (2G) wireless communication protocols IS-136 (Time Division Multiple Access (TDMA)), Global System for Mobile Communications (GSM), and IS-95 (Code Division Multiple Access (CDMA)), Third generation (3G) wireless communication protocols such as Universal Mobile Telecommunications System (UMTS), CDMA 2000, Wideband CDMA (WCDMA) and Time Division Synchronous CDMA (TD-SCDMA), and/or Fourth generation (4G) wireless communication protocols, wireless networking protocols such as 802.11, short range wireless protocols such as Bluetooth, and/or the like. The communication module 15 may operate in accordance with a wired protocol, such as Ethernet, digital subscriber line (DSL), asynchronous transfer mode (ATM), and/or the like.

The processor 11 may include a module such as a circuit for implementing audio, video, communication, navigation, logic functions, and/or the like, as well as for implementing embodiments of the present disclosure including, for example, one or more functions of the functions described herein. For example, the processor 11 may include modules for performing various functions, including, for example, one or more of the functions described herein, such as digital signal processors, microprocessors, various analog-to-digital converters, digital to digital analog converters, processing circuits and other support circuits. The electronic device 10 may perform control and signal processing functions. The processor 11 may include a function of encoding and interleaving messages and data before modulation and transmission. The processor 11 may also include an internal voice coder, which may include an internal data modem. In addition, the processor 11 may include one or more software programs that may be stored in the memory, and the software program may cause the processor 11 to implement at least one embodiment, such as one or more of the functions described herein. For example, the processor 11 may operate a connectivity program, such as a conventional web browser. The connectivity program may allow the electronic device 10 to transmit and receive web content (such as location-based content and/or other web content) according to protocols such as Transmission Control Protocol (TCP), Internet Protocol (IP), User Datagram Protocol UDP, Internet Message Access Protocol (IMAP), Post Office Protocol (POP), Simple Mail Transfer Protocol (SMTP), Wireless Application Protocol (WAP), Hypertext Transfer Protocol (HTTP), and/or the like.

The electronic device 10 may include a user interface for providing output and/or receiving input. The electronic device 10 may include an output apparatus 14. The output apparatus 14 may include an audio output apparatus such as a ringer, an earphone, a speaker, and/or the like. The output apparatus 14 may include a tactile output apparatus such as a vibration sensor, an electrically deformable surface, an electrically deformable structure, and/or the like. The output apparatus 14 may include a visual output apparatus, such as a display, a light, and/or the like. The electronic device may include an input apparatus 13. The input apparatus 13 may include a light sensor, a proximity sensor, a microphone, a touch sensor, a force sensor, a button, a keypad, a motion sensor, a magnetic field sensor, a motion sensor, a camera, and/or the like. In embodiments that include a touch display, the touch display may be configured to receive input from a single touch, a multi-touch, and/or the like. In such embodiments, the touch display and/or processor may determine the input based at least in part on the orientation, motion, speed, contact area, and/or the like.

The electronic device 10 may include various touch displays. For example, the touch display is configured to enable touch recognition by various resistive, capacitive, infrared, strain gauges, surface waves, optical imaging, dispersive signal technology, acoustic pulse recognition, and/or other technologies and then to provide a signal indicating the location and other parameters associated with the touch. In addition, the touch display may be configured to receive an indication of an input in the form of a touch event, which may be defined as the actual physical touch between the pointer (e.g., a finger, a stylus needle, a stylus pen, or other pointing device) and the touch display. The touch input may include any input detected by the touch display that includes a touch event that relates to the actual physical contact and a touch event that does not involve physical contact but is otherwise detected by the touch display. The touch display may receive information associated with the touch input associated with the force applied to the touch screen. For example, the touch screen may distinguish between heavy touch input and soft touch input. In at least one exemplary embodiment, the display may display two-dimensional information, three-dimensional information, and/or the like.

The input apparatus 13 may include a media capture element. The media capture element may be any means for storing, displaying or transmitting images, video, and/or audio. For example, in at least one exemplary embodiment (in which the media capture element is a camera module), the camera module may include a digital camera that may form a digital image file from the captured image. Thus, the camera module may include hardware (such as a lens or other optical component (s)) and/or software needed to create a digital image from the captured image. Alternatively, the camera module may include hardware only for viewing an image, and the storage of the electronic device 10 stores, in the form of software, instructions for execution by the processor 11 for creating a digital image from the captured image. In at least one exemplary embodiment, the camera module may further include a processing element (such as a coprocessor) and an encoder and/or decoder. The processing element is configured to assist the processor 11 to process the image data. The encoder and/or decoder are configured to compress and/or decompress the image data.

The encoder and/or decoder may operate according to a standard format, such as the Joint Photographic Experts Group (JPEG) standard format, the Moving Picture Experts Group (MPEG) standard format, the Video Coding Expert Group (VCEG) standard format, or any other suitable standard format for encoding and/or decoding.

FIG. 2 is a flowchart illustrating a method for adjusting grayscale values of an image according to an embodiment of the present disclosure. The method 200 may be performed at a device such as the electronic device 10 as shown in FIG. 1. Accordingly, the electronic device 10 may provide modules for implementing various portions of the method 200 as well as modules for implementing other functions of the electronic device 10.

As shown in FIG. 2, the method 200 begins at block 201. In block 201, a first mapping value for the grayscale value of each pixel in the image is calculated through a histogram equalization mapping function. The image may be an image pre-stored in the memory of the electronic device 10 or an image captured in real time such as by an image sensor or an image acquired from a local location or a network location. For example, in the example where the electronic device 10 is included in an HDR display, the electronic device 10 may receive an image, e.g., from an image output device (e.g., an image processor (such as a graphics card), a video player, etc) through a display interface of the HDR display.

The image may be a color image or a grayscale image. The color image may include an image of any color model, for example, an RGB color model, an HSL color model, a CMYK color model, and the like. The format of the image includes but is not limited to: bmp, jpg, jpe.g., tiff, gif, pcx, tga, exif, fpx, svg, psd, cdr, pcd, dxf, ufo, eps, ai, raw or other suitable formats.

The histogram equalization mapping function may be any suitable histogram equalization mapping function, either existing or to be developed in the future. For example, the histogram equalization mapping function may be expressed as: $T_y:[0,2^{B_1-1}] \rightarrow [0,2^{B_2-1}]$, where B1 and B2 are the bit depths of the image. B1 and B2 may be the same or different. In general, B1≤B2. In other embodiments, B1>B2. For each input pixel Y[i,j], the first mapping value of the grayscale value of each pixel in the image may be calculated by: $V_{cur}=T[Y[i,j]]$, where, $V_{cur}$ denotes the first mapping value, T[ ] denotes the histogram equalization mapping function, as described above, and T[ ] may have any appropriate histogram equalization mapping function form.

In block 203, a second mapping value is calculated by subtracting the first preset value from the grayscale value of each pixel through a histogram equalization mapping function, and if the result of subtracting the first preset value from the grayscale value exceeds a preset grayscale range, a minimum value of the preset grayscale range is selected for calculating the second mapping value. The first preset value may be determined by various suitable methods. For example, the first preset value may be a predetermined value, a value specified by a user, a value determined by machine learning on a training dataset, or a value determined according to a user preference, and so on. As an example, the first preset value may be one. After the first preset value is determined, the second mapping value may be calculated using the same histogram equalization mapping function as shown in block 201.

As an example, the grayscale value range of may be expressed as $(2^{BitDepth}-1)$, where BitDepth denotes a bit depth. For example, if BitDepth=8, the grayscale value range is 0-255. In HDR displays, the grayscale value range may be from 0 to (210-1). In addition, in other embodiments, the grayscale value range may also be any other suitable range.

In this embodiment, if the result of subtracting the first preset value from the grayscale value exceeds the preset grayscale range, the minimum value of the preset grayscale value range is selected to calculate the second mapping value. For example, assuming that the grayscale value range is from 0 to 255, the grayscale value of the pixel is 0 and the first preset value is 1, in this case, the grayscale value smaller than the grayscale value 0 by the first present value 1 is −1, and −1 is not within the grayscale value range. Therefore, the minimum value 0 of the preset grayscale value range may be selected for calculating the second mapping value.

In this embodiment, for each input pixel Y[i,j], a second mapping value may be calculated by: $V_{prev}=T[\max(Y[i,j], r_2)-r_2]$, where, $V_{prev}$ denotes a second mapping value, $r_2$ denotes a first preset value, $T[\ ]$ denotes a histogram equalization mapping function and may be the same as the histogram equalization mapping function for calculating the first mapping value, and $\max(Y[i,j],r_2)$ denotes the maximum value of $Y[i,j]$ and $r_2$.

In block 205, a third mapping value is calculated by adding a second preset value to the grayscale value of each pixel through a histogram equalization mapping function and if the result of adding the second preset value to the grayscale value exceeds a preset grayscale range, a maximum value of the preset grayscale range is selected for calculating the third mapping value.

Similar to the first preset value, the second preset value may be determined by various suitable methods. For example, the second preset value may be a predetermined value, a value specified by the user, a value obtained by performing machine learning on a training dataset, or a value determined according to a user preference, and the like. As an example, the second preset value may be one. After the second preset value is determined, the third mapping value may be calculated using the same histogram equalization mapping function as shown in blocks 201 and 203.

In this embodiment, if the result of adding the second preset value to the grayscale value exceeds a preset grayscale range, a maximum value of the preset grayscale range is selected for calculating the third mapping value. For example, assuming that the grayscale value range is from 0 to 255, the grayscale value of the pixel is 255 and the second preset value is 1, in this case, the grayscale value larger than the grayscale value 255 by the second preset value 1 is 2:56, and 256 is not within the grayscale value range 0-255. Therefore, the maximum value 255 of the grayscale value range may be selected for calculating the third mapping value.

In this embodiment, for each input pixel Y[i,j], a third mapping value may be calculated by: $V_{next}=T[\min(Y[i,j]+r_3,2^B-1)]$ where, $V_{next}$ denotes a third mapping value, $r_3$ denotes a second preset value, $T[\ ]$ denotes a histogram equalization mapping function and may be the same as the histogram equalization mapping function for calculating the first mapping value and the second mapping value, and $\min(Y[i,j]+r_3,2^B-1)$ denotes the minimum value of $(Y[i,j]+r_3)$ and $(2^B-1)$.

It should be noted that the first preset value and the second preset value may be the same or not the same. In general, the first preset value and the second preset value may generally be an integer greater than 0, and may be a smaller value. In an embodiment, the first preset value and the second preset value may both be equal to one.

In addition, blocks 201, 203, and 205 may be performed simultaneously or sequentially. For example, blocks 201, 203, and 205 may be simultaneously performed when parallel processing is supported, and blocks 201, 203, and 205 may be sequentially performed when parallel processing is not supported. In addition, when being sequentially performed, the performing order of blocks 201, 203, and 205 may not be limited.

After the first mapping value, the second mapping value, and the third mapping value have been calculated, at block 207, the output grayscale value of each pixel may be calculated based on the first mapping value, the second mapping value, and the third mapping value and respective weights.

In this embodiment, the respective weights of the first mapping value, the second mapping value, and the third mapping value may be predetermined values, values specified by the user, values determined by machine learning on training datasets, or values determined according to the user preferences, and the like.

In this embodiment, the output grayscale value may be calculated through any suitable equation based on the first mapping value, the second mapping value, the third mapping value and the respective weights. In one embodiment, the output grayscale value may be calculated through the following equation:

$$\text{Out}[i,j]=C_2 \cdot V_{prev}+C_1 \cdot V_{cur}+C_3 \cdot V_{next}$$

Where Out[i, j] denotes the output grayscale value, and $C_1$, $C_2$ and $C_3$ are the weights of the first mapping value, the second mapping value, and the third mapping value, respectively, and $V_{cur}$, $V_{prev}$ and $V_{next}$ are the first mapping value, the second mapping value, and the third mapping value, respectively. In other embodiments, any other suitable form of equations may also be used to calculate the output grayscale value.

In one embodiment, the method 200 also includes: calculating the weights of each pixel based on pixels within a specified range around the pixel. For example, for calculating the weights of each pixel, the weights may be calculated in consideration of the statistical characteristics or other suitable characteristics of the grayscale values of the pixels within the specified range around the pixel. The specified range may have any suitable shape, such as rectangular, circular, or other regular shape. In addition, the specified range may also be an irregular shape. In addition, the specified range may be a continuous area, or may be composed of multiple non-continuous areas. In one embodiment, for each pixel, the specified range may be a square or rectangular area centered on the pixel. The specified range may be predetermined, user specified, set according to the computing capacity of the device, set according to the characteristics of the image, or the like.

In one embodiment, pixels within a specified range around each pixel may include at least 3 pixels. For example, pixels within a specified range around each pixel may include three pixels above, left, and right of the pixel or more than three pixels including pixels above, left, right, and below.

In one embodiment, pixels within a specified range around each pixel include all pixels or a portion of pixels within a specified range around the pixel. For example, a part of pixels may be evenly selected within a specified range. For selecting a part of pixels, the computing resources may be saved, the calculation speed may be increased, and the embodiments of the present disclosure may be easily applied on devices with poor computing and/or storage capabilities.

Figure 3:
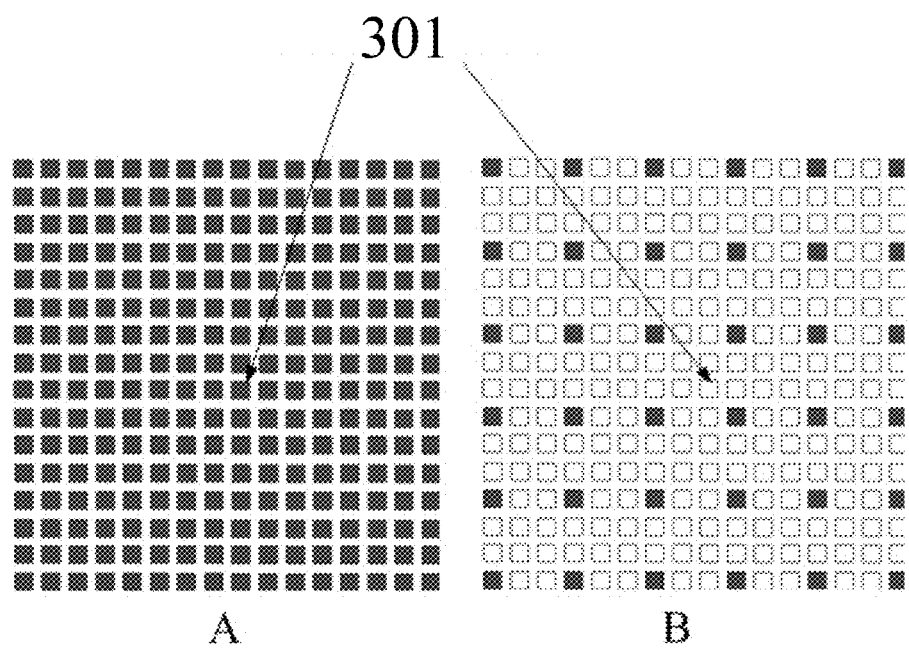
FIG. 3 is a schematic diagram illustrating pixels within a specified range around each pixel.

FIG. 3 is a schematic diagram illustrating pixels within a specified range around each pixel. FIG. 3(A) is a schematic diagram illustrating selecting all pixels within a specified range around each pixel, and FIG. 3(B) is a schematic diagram illustrating selecting a part of pixels within a specified range around each pixel. In FIGS. 3(A) and 3(B), the pixel indicated by the arrow 301 is a pixel to be calculated the grayscale value, and the specified range is a 16×16 grid (which includes 256 pixels). The small squares represent pixels, the black squares represent selected pixels, and the blank squares represent pixels that are not selected. In FIG. 3(A), the grid includes 256 selected pixels, and in FIG. 3B, the grid includes 36 selected pixels. Apparently, during the calculation of the weights, selecting a part of pixels within the specified range may significantly improve the calculation efficiency, and may not have much influence on the calculation result. Therefore, depending on different application scenarios, all pixels or a part of pixels within a specified range may be selected accordingly. For example, in cases where there is a high requirement for real-time performance or where the computing power and/or storage capacity of the device is poor, a part of the pixels within the specified range may be selected to calculate the weights, and in cases where there is a high requirement for accuracy, all pixels within the specified range may be selected to calculate the weights.

In one embodiment, the method 200 also includes: for each pixel, determining a weight of the first mapping value based on a number of pixels within the specified range around the pixel, each of which has a grayscale value equal to the grayscale value of the pixel. In this embodiment, the weight $C_1$ of the first mapping value may be calculated as follows:

$$C_1 = \frac{C_{cur}}{N},$$

where N denotes the number of pixels within a specified range around the pixel. For example, when pixels within a specified range around the pixel include all pixels within a specified range around the pixel, N may be equal to the number of all of the pixels, and when the pixels within a specified range around the pixel include a part of pixels within a specified range around the pixel, N may be equal to the number of the part of pixels. $C_{cur}$ denotes the number of pixels within the specified range around the pixel, each of which has a grayscale value equal to the grayscale value of the pixel. In other embodiments, $C_1$ may be calculated through any other suitable form of equation based on $C_{cur}$.

In one embodiment, the method 200 also includes: for each pixel, determining a weight of the second mapping value based on a number of pixels within the specified range around the pixel, each of which has a grayscale value smaller than the grayscale value of the pixel. In this embodiment, the weight $C_2$ of the second mapping value may be calculated as follows:

$$C_2 = \frac{C_{prev}}{N},$$

where N denotes the number of pixels within a specified range around the pixel. For example, when pixels within a specified range around the pixel include all pixels within a specified range around the pixel, N may be equal to the number of all of the pixels, and when the pixels within a specified range around the pixel include a part of pixels within a specified range around the pixel, N may be equal to the number of the part of pixels. $C_{prev}$ denotes the number of pixels within the specified range around the pixel, each of which has a grayscale value smaller than the grayscale value of the pixel. In other embodiments, $C_2$ may be calculated through any other suitable form of equation based on $C_{prev}$.

In one embodiment, the method 200 also includes: for each pixel, determining a weight of the third mapping value based on a number of pixels within the specified range around the pixel, each of which has a grayscale value larger than the grayscale value of the pixel. In this embodiment, the weight $C_3$ of the second mapping value may be calculated as follows:

$$C_3 = \frac{C_{next}}{N},$$

where N denotes the number of pixels within a specified range around the pixel. For example, when pixels within a specified range around the pixel include all pixels within a specified range around the pixel, N may be equal to the number of all of the pixels, and when the pixels within a specified range around the pixel include a part of pixels within a specified range around the pixel, N may be equal to the number of the part of pixels. $C_{next}$ denotes the number of pixels within the specified range around the pixel, each of which has a grayscale value larger than the grayscale value of the pixel. In other embodiments, $C_3$ may be calculated through any other suitable form of equation based on $C_{next}$.

In one embodiment, after the weights $C_1$, $C_2$ and $C_3$ are determined, the output grayscale value of the pixel may be calculated through the following formula:

$$Out[i, j] = \frac{C_{prev} \cdot V_{prev} + C_{cur} \cdot V_{cur} + C_{next} \cdot V_{next}}{N},$$

Where, $V_{cur}$, $V_{prev}$ and $V_{next}$ denote the first mapping value, the second mapping value and the third mapping value, respectively.

The method 200 may be described by the following pseudo-code:

```
FOR i = 0 .. H-1 :
    FOR j = 0 .. W-1 :
        C_prev = 0
        C_cur = 0
        C_next = 0
        FOR (n,m) ∈ S_{i,j} :
            IF Y[ i+n, j+m ] < Y[i,j] :
                C_prev = C_prev + 1
            ELSE IF Y[i+n, j+m ] = Y[i,j] :
                C_cur = C_cur + 1
        END
        C_next = N - C_prev - C_cur
        V_prev = T[max(Y[i, j], 1)- 1]
        V_cur = T[Y[i, j]]
        V_next = T[min(Y[i, j]+ 1,2^B- 1)]
```

$$\text{Out}[i, j] = \frac{C_{prev} \cdot V_{prev} + C_{cur} \cdot V_{cur} + C_{next} \cdot V_{next}}{N}$$

END
END

In the above pseudo-code, the first preset value and the second preset value are set to be equal to one.

Figure 4:
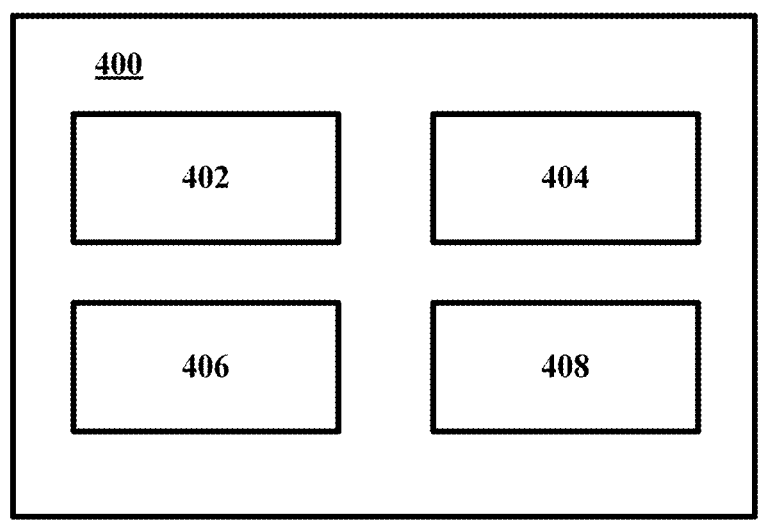
FIG. 4 is a block diagram illustrating a device according to an embodiment of the present disclosure.

Based on the same inventive concept as the above method, the present disclosure also provides a device for adjusting grayscale values of an image. FIG. 4 is a block diagram illustrating a device 400 according to an embodiment of the present disclosure. The device 400 may include modules for performing the steps of the method 200 described above. For the same portions as those in the foregoing embodiments, description thereof is omitted.

In one embodiment, the device 400 includes a module 402 configured to calculate a first mapping value for the grayscale value of each pixel in the image through a histogram equalization mapping function; a module 404 configured to calculate a second mapping value by subtracting the first preset value from the grayscale value of each pixel through a histogram equalization mapping function, and if the result of subtracting the first preset value from the grayscale value exceeds a preset grayscale range, a minimum value of the preset grayscale range is selected for calculating the second mapping value; a module 406 configured to calculate a third mapping value by adding a second preset value to the grayscale value of each pixel through a histogram equalization mapping function and if the result of adding the second preset value to the grayscale value exceeds a preset grayscale range, a maximum value of the preset grayscale range is selected for calculating the third mapping value; and a module 408 configured to calculate the output grayscale value of each pixel based on the first mapping value, the second mapping value, and the third mapping value and respective weights.

In one embodiment, the first preset value is the same as the second preset value.

In one embodiment, each of the first preset value and the second present value is equal to 1.

In one embodiment, the device also includes a module (not shown) configured to calculate the weights of each pixel based on pixels within a specified range around the pixel.

In one embodiment, the pixels within a specified range around each pixel include at least 3 adjacent pixels.

In one embodiment, the pixels within a specified range around each pixel include all pixels or a part of pixels within the specified range around the pixel.

In one embodiment, the device 400 also includes: a module (not shown) configured to, for each pixel, determine a weight of the first mapping value based on a number of pixels within the specified range around the pixel, each of which has a grayscale value equal to the grayscale value of the pixel; a module (not shown) configured to, for each pixel, determine a weight of the second mapping value based on a number of pixels within the specified range around the pixel, each of which has a grayscale value smaller than the grayscale value of the pixel; and a module (not shown) configured to, for each pixel, determine a weight of the third mapping value based on a number of pixels within the specified range around the pixel, each of which has a grayscale value larger than the grayscale value of the pixel.

Figure 5:
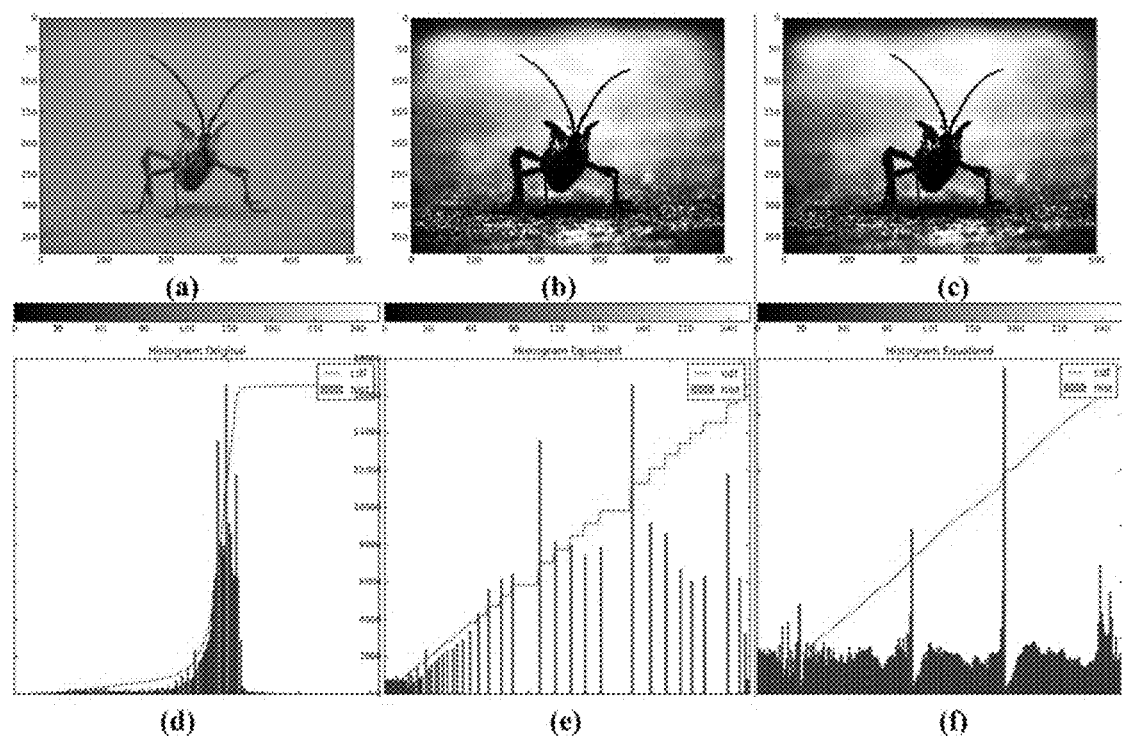
FIG. 5 shows the results of adjusting grayscale values of an image according to a method of an embodiment of the present disclosure and according to the image equalization method.

FIG. 5 shows the results of adjusting grayscale values of an image according to a method of an embodiment of the present disclosure and according to the image equalization method. FIG. 5(a) shows an original image. FIG. 5(b) shows the result of adjusting grayscale values of the image of FIG. 5(a) according to the image equalization method. FIG. 5(c) shows the result of the method according to the embodiments of the present disclosure. FIGS. 5(d)-(f) are grayscale histograms and CDF graphs of the images of FIGS. 5(a)-(c), respectively. The original image is an image of 256×256 in size. In the method according to the embodiment of the present disclosure, the specified range around each pixel is set to 8×8 pixels, each of the first preset value and the second preset value is equal to 1. It may be seen from FIG. 5(e) that, although the histogram equalization method enables the pixel grayscale values to be uniformly distributed over a larger range, there are larger voids in the histogram, and there are significant changes in the CDF graph. The presence of the voids or the significant change in the CDF graph lead to ribbons and granular noise in the image of FIG. 5(b). It may be seen from FIG. 5(f) that, the method according to the embodiments of the present disclosure may fill the voids in the histogram, and the CDF graph approximates to a straight line without significant change. As may be seen from FIG. 5(c) that, the ribbon in the image processed by the method according to the embodiments of the present disclosure has been softened, and the granular noise in the image is also reduced.

The method according to the embodiments of the present disclosure has at least the following advantages.

1) Since the method according to the embodiments of the present disclosure uses a histogram equalization mapping function, details in the image may not be removed.

2) The voids in the grayscale histogram may be filled and the significant changes in the grayscale CDF graph may be reduced.

3) Due to the weights, the method according to the embodiments of the present disclosure is insensitive to the size of the specified range around each pixel and the number of pixels. In general, including at least 3 pixels within the specified range is sufficient to enable the embodiments of the present disclosure to produce the desired effects.

4) Since the method according to the embodiments of the present disclosure may select a part of the pixels within a specified range around each pixel, the complexity of the method may be reduced, thereby saving computational and/or storage resources, enabling computation 1 storage resources limited devices to apply the method of the present disclosure. In addition, due to the reduction in the complexity of the method according to the embodiments of the present disclosure, it may increase the processing speed of an image so that a high-resolution image may be quickly processed, or it may facilitate a hardware device such as an FPGA to implement the method according to the embodiments of the present disclosure.

The method according to the embodiments of the present disclosure differs from other methods such as a median filter or a low-pass filter in that, the method according to the embodiments of the present disclosure uses three mapping values (i.e., a first mapping value, a second mapping value and a third mapping value) with weights. Since the calculation of the three mapping values is based on a histogram equalization mapping function, if the voids among the mapping values are 0 (as may be the case in regions with many details), and then the output pixel may not have significant changes, and if the voids among the mapping values are relatively large (as may be the case in regions with granular noise or ribbons), the grayscale values of the output pixels may be softened, so that the ribbons and/or granular noise may be reduced.

It is noted that any of the components of the above-described devices may be implemented as hardware, software modules, or a combination thereof. In the case of software modules, they may be included on a tangible computer readable recordable storage medium. All software modules (or any subset thereof) may be on the same medium, or each software module may be on a different medium. Software modules may run on the hardware processor. The different software modules running on the hardware processor are used to perform the steps of the method.

In addition, one aspect of the present disclosure may use software running on a general purpose computer or a workstation. Such implementations may use, for example, a processor, a memory, and an input/output interface such as that formed by a display and a keyboard. The term "processor" as used herein is intended to encompass any processing device, such as a processor that includes a CPU (Central Processing Unit) and/or other forms of processing circuitry. In addition, the word "processor" may refer to more than one processor. The word "memory" is intended to include memory such as RAM (Random Access Memory), ROM (Read Only Memory), fixed memory (e.g., hard disk), removable storage device, Flash memory and so on. The processor, memory, and input/output interfaces, such as a display and a keyboard, may be interconnected, for example, via a bus.

Thus, the computer software, which contains the instructions and codes for performing the methods of the present disclosure as described herein, may be stored in one or more associated memory in an associated storage device and, when ready for use, partially or fully loaded (e.g., loaded into RAM) and executed by the CPU. Such software may include, but is not limited to, firmware, resident software, microcode, and the like. Computer software may be computer software written in any programming language and may be in the form of source codes, object codes, or intermediate codes between source codes and object codes, such as in a partially compiled form, or in any other desired form.

Embodiments of the present disclosure may take the form of a computer program product embodied in a computer-readable medium having computer-readable program codes embodied thereon. In addition, any combination of computer-readable media may be used. The computer readable medium may be a computer readable signal medium or a computer readable storage medium. Computer-readable storage media may be, but not limited to, electrical, magnetic, electromagnetic, optical or other storage media, as well as media that may be removable or fixedly mounted in a device or an apparatus. Non-limiting examples of such computer readable media are RAM, ROM, hard disk, optical disk, optical fiber, and the like. The computer-readable medium may, for example, be a tangible medium, such as a tangible storage medium.

The words used herein are for the purpose of describing particular embodiments only, and are not intended to limit the embodiments. As used herein, the singular forms "a", "an" and "the" are intended to include the plural forms as well, unless the context clearly dictates otherwise. It is also to be understood that the terms "comprising", "having", "including" and/or "containing" when used herein refer to the presence of stated features, numbers, steps, operations, elements, and/or components, without precluding the presence or addition of one or more other features, numbers, steps, operations, elements, components, and/or combination thereof.

It should also be noted that in some alternative implementations, the functions/acts noted may occur out of the order as illustrated in the drawings. If desired, the different functions described in the present disclosure may be performed in a different order and/or concurrent with each other. In addition, one or more of the above functions may be optional or may be combined if desired.

Although embodiments of the present disclosure have been described above with reference to the accompanying drawings, those skilled in the art may understand that the above description is only an example rather than a limitation on the present disclosure. Various modifications and variations of the embodiments of the present disclosure are possible, and still fall within the spirit and scope of the present disclosure, the scope of the present disclosure is to be determined merely by the appended claims.

What is claimed is:

1. A method for adjusting grayscale values of an image, comprising:
   for each pixel in the image,
   calculating a first mapping value for a grayscale value of the pixel in the image through a histogram equalization mapping function;
   calculating a second mapping value by subtracting a first preset value from the grayscale value of the pixel through the histogram equalization mapping function, and when the result of subtracting the first preset value from the grayscale value exceeds a preset grayscale range, selecting a minimum value of the preset grayscale range for calculating the second mapping value;
   calculating a third mapping value by adding a second preset value to the grayscale value of the pixel through the histogram equalization mapping function and when the result of adding the second preset value to the grayscale value exceeds the preset grayscale range, selecting a maximum value of the preset grayscale range for calculating the third mapping value; and
   calculating an output grayscale value of the pixel based on the first mapping value, the second mapping value, and the third mapping value and a weight of the first mapping value, a weight of the second mapping value, and a weight of the third mapping value; and
   outputting the output grayscale value to a pixel;
   wherein each of the first preset value and the second preset value is equal to 1;
   wherein the weight of the first mapping value is calculated based on a number of pixels out of a grouping that includes at least 3 adjacent pixels to the pixel that have a greyscale value equal to the pixel;
   wherein the weight of the second mapping value is calculated based on a number of pixels out of a grouping that includes at least 3 adjacent pixels to the pixel that have a greyscale value smaller than the pixel; and
   wherein the weight of the third mapping value is calculated based on a number of pixels out of a grouping that includes at least 3 adjacent pixels to the pixel that have a greyscale value larger than the pixel.

2. The method according to claim 1, further comprising calculating the weights of each pixel based on pixels within a specified range around the pixel.

3. The method according to claim 2, wherein the pixels within the specified range around each pixel comprise at least 3 adjacent pixels.

4. The method according to claim 2, wherein the pixels within the specified range around each pixel comprise all pixels or a part of pixels within the specified range around the pixel.

5. The method according to claim 2, further comprising:
for each pixel, determining a weight of the first mapping value based on a number of pixels within the specified range around the pixel, each of the pixels within the specified range around the pixel having a grayscale value equal to the grayscale value of the pixel.

6. The method according to claim 2, further comprising:
for each pixel, determining a weight of the second mapping value based on a number of pixels having a grayscale value smaller than the grayscale value of the pixel, within the specified range around the pixel.

7. The method according to claim 2, further comprising:
for each pixel, determining a weight of the third mapping value based on a number of pixels having a grayscale value larger than the grayscale value of the pixel, within the specified range around the pixel.

8. A device for adjusting grayscale values of an image, comprising:
a processor in communication with memory configured to, for each pixel in the image, calculate a first mapping value for a grayscale value of the pixel in the image through a histogram equalization mapping function;
a processor in communication with memory configured to calculate a second mapping value by subtracting a first preset value from the grayscale value of the pixel through the histogram equalization mapping function, and when the result of subtracting the first preset value from the grayscale value exceeds a preset grayscale range, select a minimum value of the preset grayscale range for calculating the second mapping value;
a processor in communication with memory configured to calculate a third mapping value by adding a second preset value to the grayscale value of the pixel through the histogram equalization mapping function and when the result of adding the second preset value to the grayscale value exceeds the preset grayscale range, select a maximum value of the preset grayscale range for calculating the third mapping value; and
a processor in communication with memory configured to calculate an output grayscale value of the pixel based on the first mapping value, the second mapping value, and the third mapping value and a weight of the first mapping value, a weight of the second mapping value, and a weight of the third mapping value; and
a display device that is configured to receive the output grayscale value of the pixel;
wherein each of the first preset value and the second preset value is equal to 1;
wherein the weight of the first mapping value is calculated based on a number of pixels out of a grouping that includes at least 3 adjacent pixels to the pixel that have a greyscale value equal to the pixel;
wherein the weight of the second mapping value is calculated based on a number of pixels out of a grouping that includes at least 3 adjacent pixels to the pixel that have a greyscale value smaller than the pixel; and
wherein the weight of the third mapping value is calculated based on a number of pixels out of a grouping that includes at least 3 adjacent pixels to the pixel that have a greyscale value larger than the pixel.

9. The device according to claim 8, further comprising a processor in communication with a memory configured to calculate the weights of each pixel based on pixels within a specified range around the pixel.

10. The device according to claim 9, wherein the pixels within the specified range around each pixel comprise at least 3 adjacent pixels.

11. The device according to claim 9, wherein the pixels within the specified range around each pixel comprise all pixels or a part of pixels within the specified range around the pixel.

12. The device according to claim 9, further comprising:
a processor in communication with a memory configured to, for each pixel, determine a weight of the first mapping value based on a number of pixels having a grayscale value equal to the grayscale value of the pixel, within the specified range around the pixel.

13. The device according to claim 9, further comprising:
a processor in communication with a memory configured to, for each pixel, determine a weight of the second mapping value based on a number of pixels having a grayscale value smaller than the grayscale value of the pixel, within the specified range around the pixel.

14. The device according to claim 9, further comprising:
a processor in communication with a memory configured to, for each pixel, determine a weight of the third mapping value based on a number of pixels having a grayscale value larger than the grayscale value of the pixel, within the specified range around the pixel.

* * * * *